Figure 1:
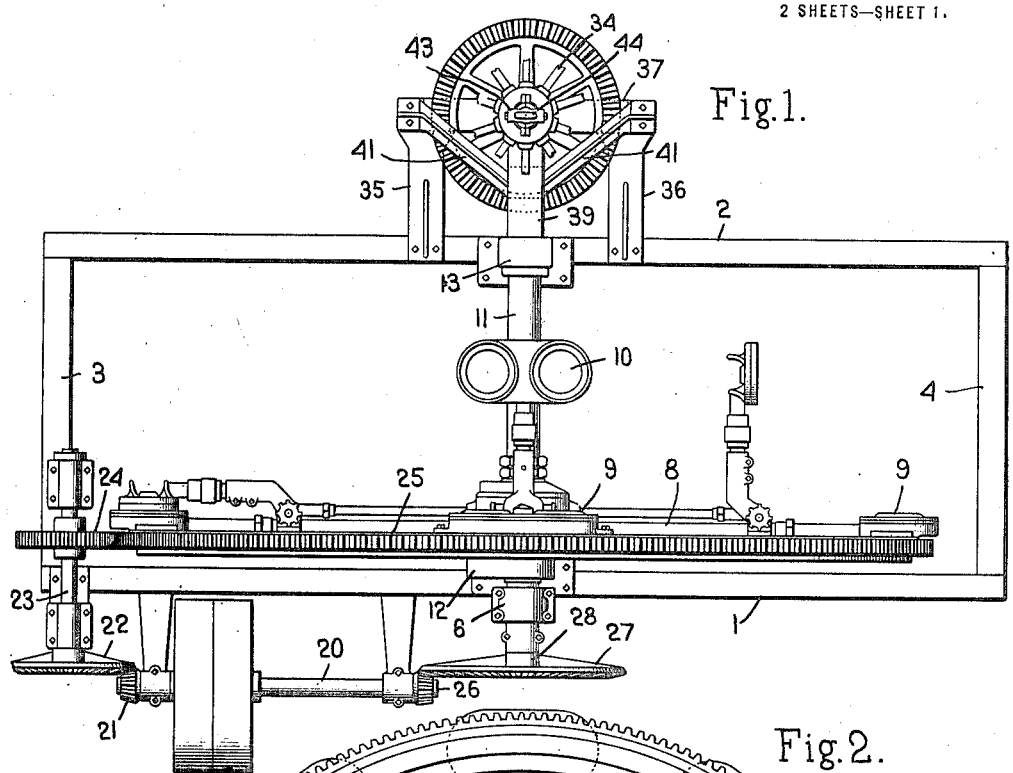

M. P. CHAPLIN.
APPARATUS FOR MOLDING ARTICLES FROM PULP.
APPLICATION FILED NOV. 11, 1913.

1,186,647.

Patented June 13, 1916.
2 SHEETS—SHEET 1.

Witnesses.
E. Morrill Fuller
William E. Gagen

Inventor.
Merle P. Chaplin,
by Heard Smith & Tennant.
Atty's.

M. P. CHAPLIN.
APPARATUS FOR MOLDING ARTICLES FROM PULP.
APPLICATION FILED NOV. 11, 1913.

1,186,647.

Patented June 13, 1916.
2 SHEETS—SHEET 2.

Witnesses.
J. Morrill Fuller
William E. Gagen

Inventor.
Merle P. Chaplin,
by Heard Smith & Tennant.
Atty's.

UNITED STATES PATENT OFFICE.

MERLE P. CHAPLIN, OF FAIRFIELD, MAINE, ASSIGNOR TO KEYES FIBRE COMPANY, OF WATERVILLE, MAINE, A CORPORATION OF MAINE.

APPARATUS FOR MOLDING ARTICLES FROM PULP.

1,186,647.     Specification of Letters Patent.     Patented June 13, 1916.

Application filed November 11, 1913. Serial No. 800,395.

*To all whom it may concern:*

Be it known that I, MERLE P. CHAPLIN, a citizen of the United States, residing at Fairfield, county of Somerset, State of Maine, have invented an Improvement in Apparatus for Molding Articles from Pulp, of which the following description, in connection with the accompanying drawing, is a specification, like characters on the drawing representing like parts.

This invention relates to improvements in apparatus for making articles from pulp, of the type disclosed in patents previously granted to Martin L. Keyes, Nos. 740,023, dated Sept. 29, 1903, 759,616, dated May 10, 1904, 788,138, dated April 25, 1905, and 908,557, dated Jan. 5, 1909. The apparatus disclosed in these patents comprises a rotating series of molds mounted upon a horizontal axis, each mold having nesting faces between which the article is formed, a vat to contain the pulp so located that one or both of the mold faces are adapted to dip into said pulp during a portion of the revolution of the mold carrier, means to apply suction to one face of the mold while it is immersed in the pulp, whereby a layer of pulp is deposited upon said face, and means to close the mold faces together and compress the pulp layer into an article of the desired shape. Means are also provided for removing the molded article from the mold face which consist of a pickoff mounted to rotate about a vertical axis and having hollow arms terminating in suckers extending over the path of one of the series of mold parts. Suction is applied through one of these arms just as each mold member reaches the horizontal plane of the pickoff, the article is caused to adhere to the same, and is carried thereby to a point directly over a conveyer leading to a drier, when it is released from the pickoff by a short blast of compressed air projected through said hollow arm. The parts of the molding mechanism and the pickoff mechanism are necessarily of considerable weight, and difficulty has been found in the machines heretofore constructed in obtaining a structure which would rigidly support this weight, nowithstanding the jarring of the moving parts.

One of the objects of the present invention is to provide a rigid frame work for the support of the molding apparatus and of the pickoff mechanism.

Another object of the invention is to so dispose the driving mechanism for the mold carrier and the pick-off mechanism upon the frame of the machine as to avoid the transmission of vibration from the rotatable mold carrier to the pick-off mechanism.

It has been found in practice that in the machines heretofore constructed the lower bearing which carries the transferring device was too weak to carry the entire weight thereof, and that it was impossible to so support the rotating pickoff upon its shaft as to remove the entire weight or substantially the entire weight of the same from the head through which the compressed air is introduced into said revolving part. This frequently caused the valve between the stationary and rotating parts to become dry and to turn so hard as to throw the suckers of the pickoff out of adjustment.

Another object of the present invention therefore, is to provide a construction whereby the entire weight of the rotating transferring device may be carried upon the shaft if desired, a further object being to provide a means for adjusting said rotating pickoff upon its shaft so that the amount of pressure between the same and the stationary head may be regulated as desired.

It is sometimes desirable to remove the rotary transferring device from the machine for purposes of repair, etc., and another object of the invention is to provide means whereby it may be removed without dismantling its driving shaft.

Other objects of the invention will more fully appear from the following description and the annexed drawing, and will be more particularly pointed out in the subjoined claims.

Figure 2:
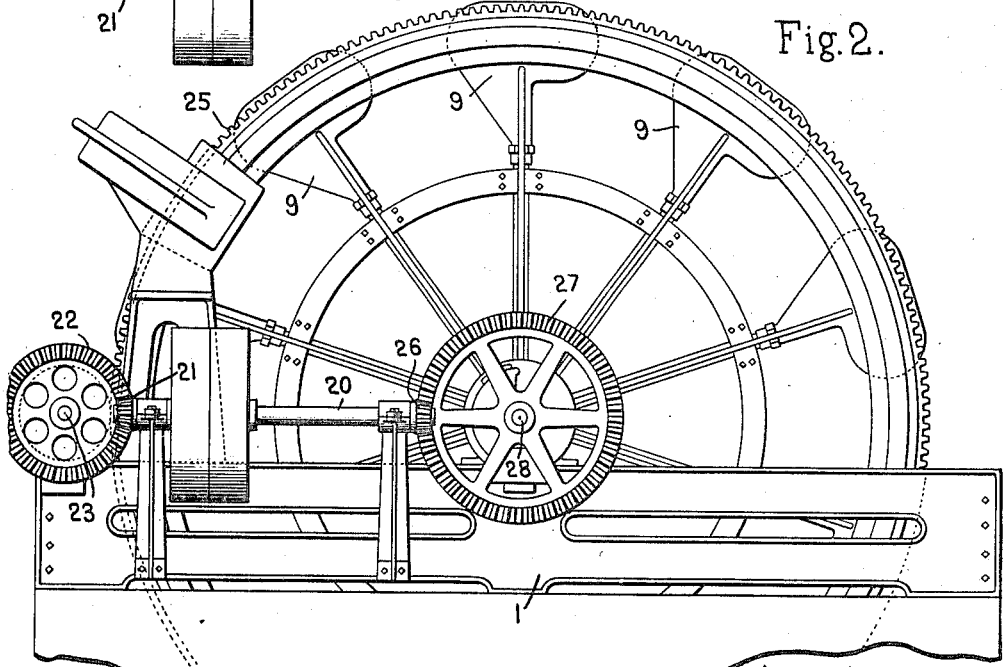
Figure 3:
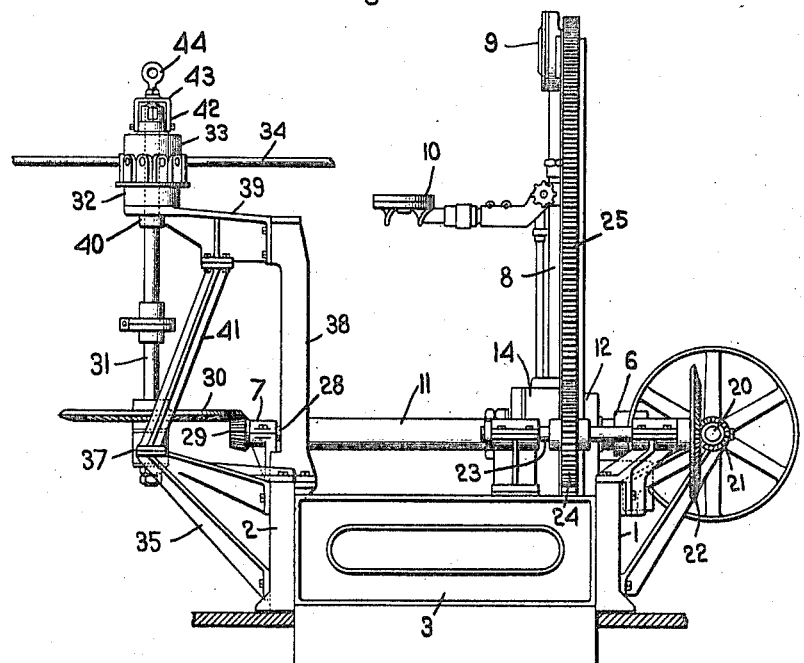
Figure 4:
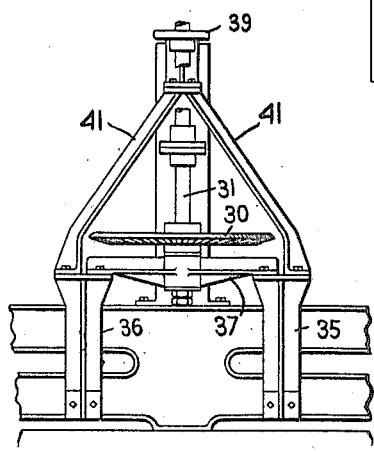
Figure 5:
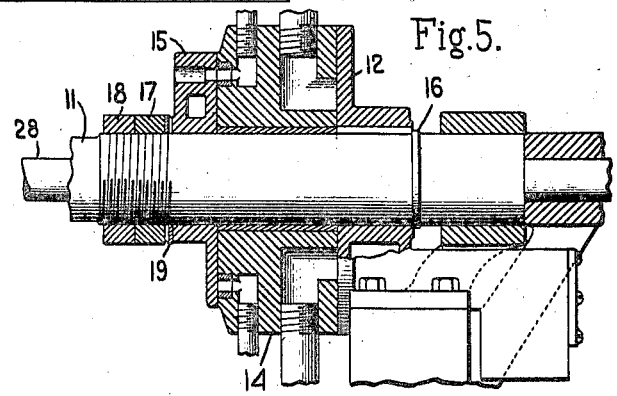

Figure 1 is a plan view of an apparatus for molding articles from pulp, the rotating sucker head and the clamp for compressing the jaws of the mold being removed; Fig. 2 is a side elevation; Fig. 3 is an end view of the supporting frame and sufficient illustration of the rotating mold members and the transferring device to show the relative arrangement of the parts; Fig. 4 is a detail front elevation of the supporting frame for the transferring device, and Fig. 5 is a sectional view of the hub for the revolving mold carrier and the mechanism coöperating therewith.

In the apparatus shown in the drawings, a main frame is provided consisting of side pieces 1, 2 constructed of metal and united by ends 3, 4. This frame is supported by the floor and a vat 5, made in any suitable manner, depends from said frame below the level of the floor. The rotating mold carrier is supported upon suitable journals 6 and 7 upon the top of the side frames 1, 2, the main driving mechanism therefor being supported by the side frame 1 and the mechanism for rotating the transferring device being secured to and supported by the side frame 2.

The rotating mold carrier 8 and the mold members 9, 10 carried thereby are of the type disclosed in the patents to Martin L. Keyes above referred to and do not need further description. The means for supporting the mold carrier are, however, of a novel construction which provides for the balancing of the weight of the driving mechanism and the transferring mechanism, and by uniting the opposite sides of the frame midway of their length serves to strengthen the same. This means comprises a hollow sleeve 11 mounted in collars 12—13 secured to the plates 1 and 2 respectively. The sleeve is clamped in these collars against rotation and the hub 14 of the mold carrier is rotatably mounted thereon. The sleeve 11 serves as a conduit for the shaft which transmits power from the main driving shaft to the rotary pickoff and thereby provides for the balancing of the weight of the rotating parts medially of the sides of the main frame.

The mold members 9—10 are carried at the extremities of hollow arms connected to the hub and the hub is provided with ports therefor adapted to connect with vacuum chambers and with compressed air chambers in the stationary collar 12, and an opposing collar 15 which abut the end faces of the hub in substantially the same manner as disclosed in the patents to Martin L. Keyes aforesaid. These collars are retained in close contact with the end faces of the hub to provide air tight valves by a collar 16 turned or shrunken on the shaft and abutting collar 12, and a pair of check nuts 17—18, adapted to bear against the collar 15 and force the same tightly against the hub. Suitable spring washers 19 may be interposed between said check nuts and the hub.

In machines of this type heretofore constructed the mold carrier and the pick-off mechanism have been driven from the same shaft and the uneven resistance encountered by the mold members during their rotation through the vat, their engagement with the compressing mechanism, etc., caused a vibration of the pick-up mechanism which sometimes resulted in its disarrangement. In order to avoid this objection I have devised a construction in which the rotary pick-off mechanism is driven from a shaft independent of the shaft which rotates the mold carrier, both however being actuated from a common main driving mechanism.

The main driving mechanism comprises fast and loose pulleys mounted upon a shaft 20 journaled in bearings suitably supported from the side frame 1. The shaft 20 is provided at its outer end with a beveled gear 21, which engages a suitable gear 22 upon a counter shaft 23 carrying a gear 24 which engages a large gear 25 upon the periphery of the mold carrier, thus serving to transmit rotary motion to the mold carrier. At the inner end of the shaft 20 another beveled gear 26 is provided which meshes with a gear 27 adapted to drive upon a counter shaft 28 for rotating the transferring mechanism. The shaft 28 is journaled in and passes through the sleeve 11, and is provided at its end with a gear 29 engaging a gear 30 upon a vertical shaft 31 which supports and drives the transferring mechanism or pickoff.

The transferring mechanism comprises a stationary head 32 provided with a vacuum chamber and a compressed air chamber adapted to alternately communicate with ports in a hub 33 leading to the hollow arms 34, which, as before stated, terminate in suckers.

The stationary head 32 and the rotating hub 33 constitute a valve for the vacuum and compressed air mechanism and it is necessary that this valve be maintained air tight, but it must not bind.

In the devices heretofore constructed it has been found that the lower bearing for supporting the rotating hub was of insufficient strength and rigidity to support the entire weight of the rotating hub, its arms and suckers, and that the latter by sagging down would cause such friction between the relatively rotating faces of the hub and head as to cause the same to become dry and by reason of the increased friction resulting therefrom throw the suckers out of proper position to coöperate with the mold faces.

In the embodiment of the invention shown in the drawings of this application, an improved form of support for the transferring device is provided. It comprises two V-shaped members or struts 35—36 secured to the side 2 of the frame, and preferably extending somewhat upwardly and laterally therefrom. A shaft 31 for supporting and rotating the transferring device is stepped in the cross-piece 37 carried by the members 35 and 36 near the apexes thereof.

The upper bearing for the shaft and support for the stationary head 32 comprises an upwardly extending member 38 secured to the upper edge of the side frame 2 and provided with a lateral extension 39, which may be secured to the member 38 by bolts, or may be an integral extension thereof. This lateral extension 39 is provided at its outer end with a bearing 40 for the shaft 31 and is also provided with a flat surface upon which the head 32 is adapted to rest, and to which the same is secured.

Greater rigidity is given to the upper bearings by means of a pair of braces or struts 41 which extend from the apexes of the members 35 and 36 to the under surface of the laterally extending member 39, said braces being secured at their ends to the respective members by suitable bolts or other fastening devices. By this construction ample space is provided for the gear 30 which drives the vertical shaft 31 carrying transferring device, and ready access is afforded to the transferring mechanism.

In order to provide the proper amount of pressure between the rotating transferring device 33 and the stationary head 32 to make an air tight joint for the valve and still permit free rotation, means are provided whereby the relative positions of these parts may be adjusted. This means as illustrated in the preferred embodiment of the invention shown in the drawing, comprises a yoke 42 secured to the head 33 by bolts or other suitable fastening devices, the cross arm 43 of said yoke being so arranged as to pass across the end of the shaft 31, and an eye-bolt 44 screw threaded through the cross-piece 43 of the yoke, and abutting against the end of the shaft 31. The eye-bolt not only serves as a means for adjusting the rotating hub 33 relatively to the stationary head 32, but also provides a means whereby the rotating parts of the transferring device may be removed from the machine without dismantling the driving shaft 31, it being merely necessary to connect a crane or other hoisting device to the eye in the eye-bolt 43 to lift the entire transferring device off of the shaft 31.

It is to be understood that the particular embodiment of the invention shown in the drawings, and above described, is merely illustrative of the features of my invention, and not restrictive and that the invention disclosed herein may be embodied in other forms.

Having fully described my invention, what I claim as new, and desire to secure by Letters Patent is:

1. In an apparatus of the class described comprising a series of rotating mold members adapted to mold articles from pulp and rotatable transferring mechanism for removing the molded article from said molds, a vertical shaft for rotating said transferring mechanism, upper and lower bearings for said shaft, and means for adjusting said transferring device longitudinally of said shaft.

2. In an apparatus of the class described, a transferring device comprising a head having a vacuum chamber and a compressed air chamber, a hub rotatably mounted thereon, and provided with suction members adapted to communicate alternately with the vacuum chamber and the compressed air chamber in said head to pick up the molded articles and release the same, a shaft for rotating said hub, and adjustable supporting means connecting said hub to said shaft whereby the pressure between the relatively rotating faces of the hub and head may be regulated.

3. In an apparatus of the class described, a transferring device comprising a head having a vacuum chamber and a compressed air chamber, a hub rotatably mounted thereon, and provided with suction members adapted to communicate alternately with the vacuum chamber and the compressed air chamber in said head to pick up the molded articles and release the same, a shaft for rotating said hub, means connecting said shaft to said hub, whereby the pressure between the relatively rotating faces of the hub may be regulated comprising a yoke secured to said hub and extending over the end of said shaft, and adjustable means interposed between said yoke and the end of said shaft.

4. In an apparatus of the class described, a transferring device comprising a head having a vacuum chamber and a compressed air chamber, a hub rotatably mounted thereon, and provided with suction members adapted to communicate alternately with the vacuum chamber and the compressed air chamber in said head to pick up the molded articles and release the same, a shaft for rotating said hub, means connecting said shaft to said hub, whereby the pressure between the relatively rotating faces of the hub may be regulated comprising a yoke secured to said hub and extending over the end of said shaft, and a screw passing through said yoke and bearing upon the end of said shaft.

5. In a machine of the class described having a rotary transferring device comprising a hub provided with pickoffs and means for operating the same, a shaft for driving said hub and means connecting said shaft and hub, whereby said hub may be adjusted longitudinally of said shaft, or removed from the same without dismantling the latter, comprising a yoke secured to said hub and extending over the end of said shaft and an eye-bolt screw threaded through said yoke and bearing upon the end of said shaft.

6. In an apparatus of the class described comprising a main frame, a series of rotating molds carried thereby and a transferring device, an auxiliary frame attached to said main frame and adapted to support said transferring device, comprising a pair of converging members secured to one side of the main frame, a horizontally disposed member near the apexes of said conveying members, a vertical member rising from the main frame intermediate of said members, a member extending laterally therefrom, struts rising from near the apexes of the converging members and connected to said laterally extending member, alined journal bearings in said horizontal and lateral extending members, and a rotatable shaft supporting said transferring device journaled therein.

7. In an apparatus of the class described comprising a rotating mold carrier provided with a series of molds and a rotating transferring device for the molded articles, a hollow sleeve for supporting the revolving mold carrier, a shaft mounted therein adapted to drive said transferring device, means for revolving said mold carrier, and means for rotating said shaft.

8. In an apparatus of the class described comprising a revolving mold carrier provided with a series of molds, a rotating transferring device, a frame having parallel sides, a driving shaft mounted upon one of said sides, means for rotating the mold carrier therefrom, means mounted upon the opposite side for supporting and for driving the transferring device, a sleeve extending across said frame, a mold carrier rotatably mounted on said sleeve, and a shaft rotatably journaled in said sleeve for transmitting power from said main shaft to said transferring device.

9. In an apparatus of the class described comprising a rotatable mold carrier provided with a series of coöperating mold members and a rotatable transferring device adapted to remove the molded articles from said mold members; means for rotating the mold carrier and independent means for rotating the transferring device, whereby the vibration of the mold carrier will not be imparted to the transferring device.

10. In an apparatus of the class described comprising a rotatable mold carrier provided with a series of coöperating mold members and a rotatable transferring device adapted to remove the molded articles from said mold members; a main driving shaft and independent means operated thereby to rotate respectively said mold carrier and said transferring device, whereby the vibration of the mold carrier will not be imparted to the transferring device.

In testimony whereof, I have signed my name to this specification, in the presence of two subscribing witnesses.

MERLE P. CHAPLIN.

Witnesses:
HARRY L. HOLMES,
C. A. BRADBURY.